UNITED STATES PATENT OFFICE.

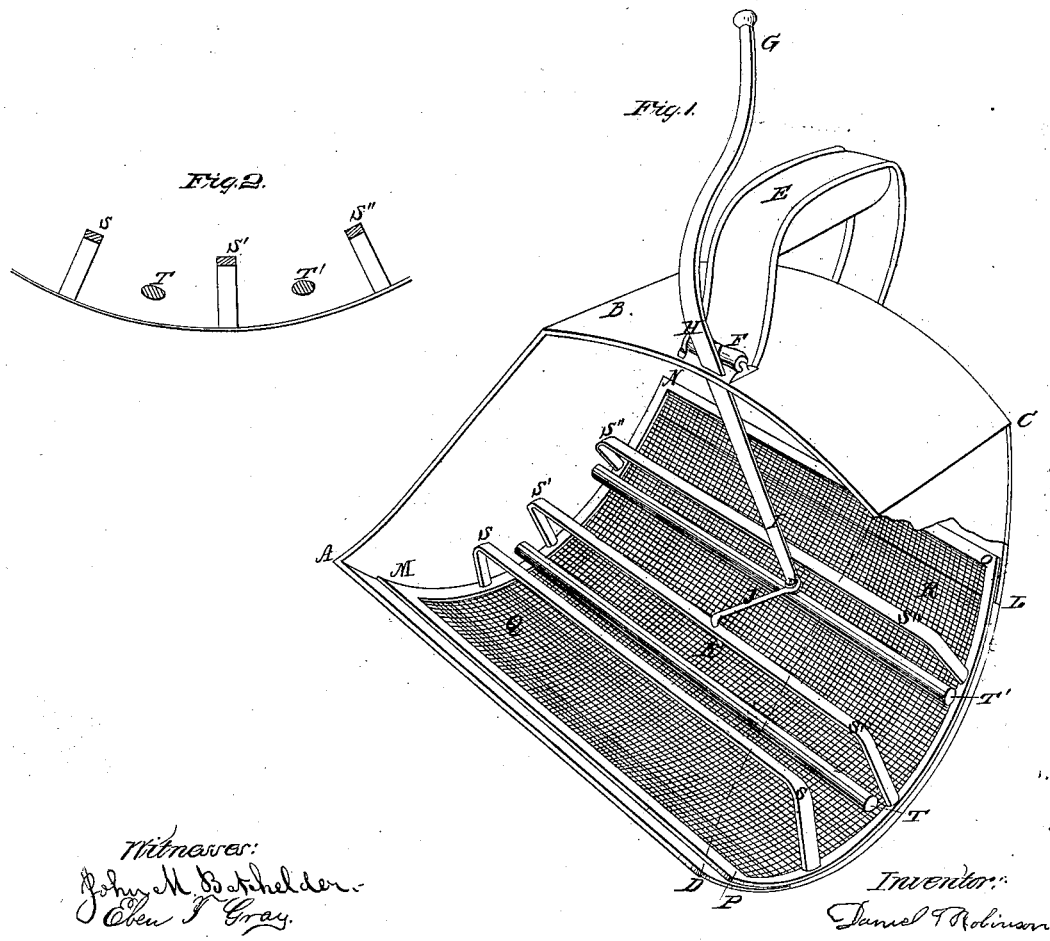

DANIEL T. ROBINSON, OF BOSTON, MASSACHUSETTS, ASSIGNOR TO HIMSELF AND HOWARD TILDEN, OF SAME PLACE.

FLOUR-SIFTER.

Specification forming part of Letters Patent No. 51,901, dated January 2, 1866.

*To all whom it may concern:*

Be it known that I, DANIEL T. ROBINSON, of Boston, in the county of Suffolk and State of Massachusetts, have invented an Improvement in Flour-Sifters; and I do hereby declare that the following is a full and exact description of the same, reference being had to the accompanying drawings, and to the letters and figures marked thereon.

Figure I is a perspective view. Fig. II is a vertical section, showing the relative position of the horizontal bars.

My improvement in flour-sifters is intended to be used both as a sieve and a scoop, and is so constructed that in the operation of sifting the motion is vibrating, and very nearly resembles that of a common sieve, while at the same time a series of bars or rods prevent the flour from caking, and keep it in a light condition, ready for passing through the wire-netting.

The scoop A B C L D has the handle E upon the top, in front of which there is a rocker-joint, F, to which is soldered the curved handle or lever G H I, the part G H being above the scoop and the part H I within it.

The sieve or wire net-work Q R occupies nearly the whole of the bottom of the scoop, and is soldered to the frame M N O P. Its curvature from front to rear is circular, the center of the circle being at the fulcrum or joint F. The bottom of the scoop, from L to D, is struck with the same sweep, so that the sieve may play freely back and forth upon the narrow rim or border left at the outer edge of the bottom of the scoop.

To the rim of the frame several small flat bars are affixed, as shown at S S' S''. They extend across the breadth of the sifter, and are slightly elevated above the net-work or sieve Q R. There are also several fixed bars, T T', parallel with the bars S, soldered to the upright side of the scoop. A connecting rod or wire, J, is jointed to the bent lever at I, its outer end, K, being bent at right angles and slipped through a hole made in one of the transverse bars, S.

Suitable stops or knobs are affixed to the scoop to govern the distance of the vibration of the sieve, or it may be stopped by the bars T.

To operate the sifter, the handle E is held with the left hand, while the right hand grasps the bent lever at G H. As this is moved back and forth alternately a vibratory motion is given to the sieve, which plays on the curved rim before mentioned, and causes the flour to pass through the wire-netting. One series of the bars being fixed and the other movable, the flour is kept in motion above the net-work as the bars pass each other, thus causing the lower stratum to be light and in suitable condition to pass readily through the sieve.

I am aware that a scoop and sifter have been heretofore used, as in the common coal-sifter having a perforated bottom, and in patents issued to Earnshaw and others.

What I claim, and desire to secure by Letters Patent, is—

The combination of the scoop, its vibrating sieve, and the double series of transverse bars, arranged with reference to each other, substantially as herein described.

DANIEL T. ROBINSON. [L. S.]

In presence of—
JOHN M. BATCHELDER.
EBEN P. GRAY.